Dec. 25, 1923.

S. B. LEITZELL

AUTO BRAKE

Filed April 20, 1922

S. B. Leitzell, Inventor

By Cashow & Co.
Attorney

Patented Dec. 25, 1923.

1,478,969

UNITED STATES PATENT OFFICE.

SAMUEL B. LEITZELL, OF BUTLER, PENNSYLVANIA.

AUTO BRAKE.

Application filed April 20, 1922. Serial No. 555,780.

*To all whom it may concern:*

Be it known that I, SAMUEL B. LEITZELL, a citizen of the United States, residing at Butler, in the county of Butler and State of Pennsylvania, have invented a new and useful Auto Brake, of which the following is a specification.

This invention relates to brake structures especially designed for use in connection with motor vehicles, the primary object of the invention being to provide a brake which will be equalized at all times to insure the true braking of the vehicle equipped therewith.

Another object of the invention is to provide means for applying the brake, the applying means being such as to cause the brake element to contact with the brake band or housing associated therewith, throughout the entire surface thereof.

A still further object of the invention is to provide means for accurately adjusting the movable sections of the brake with respect to the stationary section thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a sectional view through one form of operating means.

Figure 1:
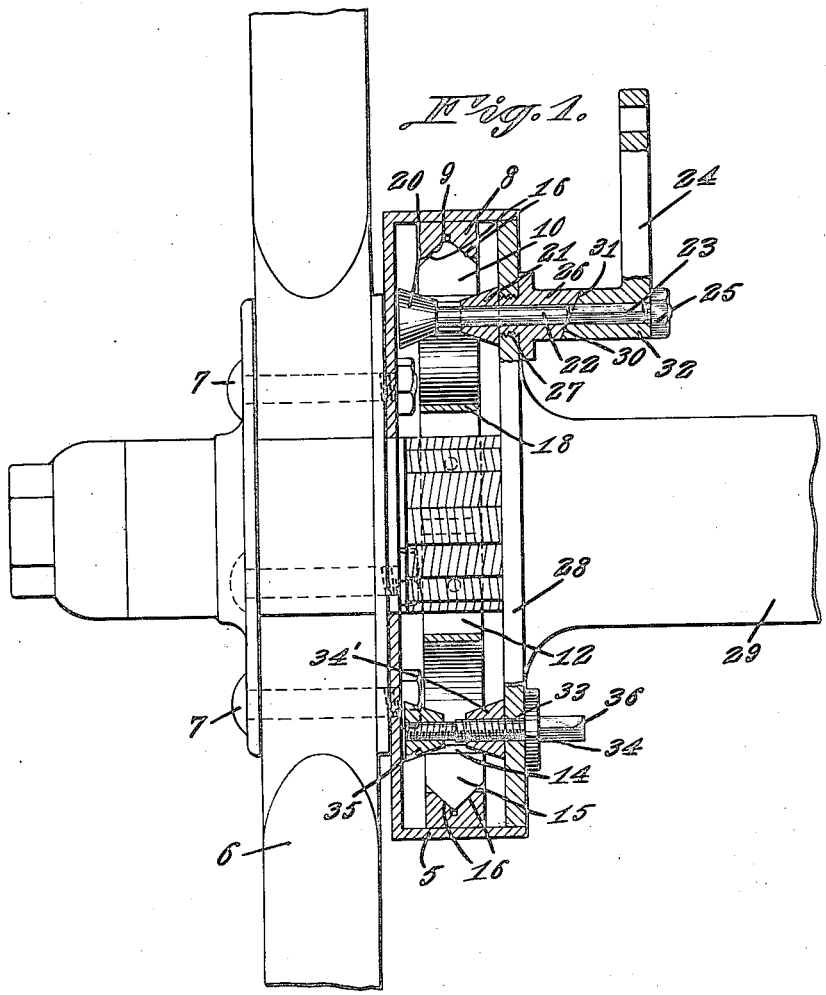
Figure 1 is an elevational view disclosing the brake and brake housing in section.
Figure 2:
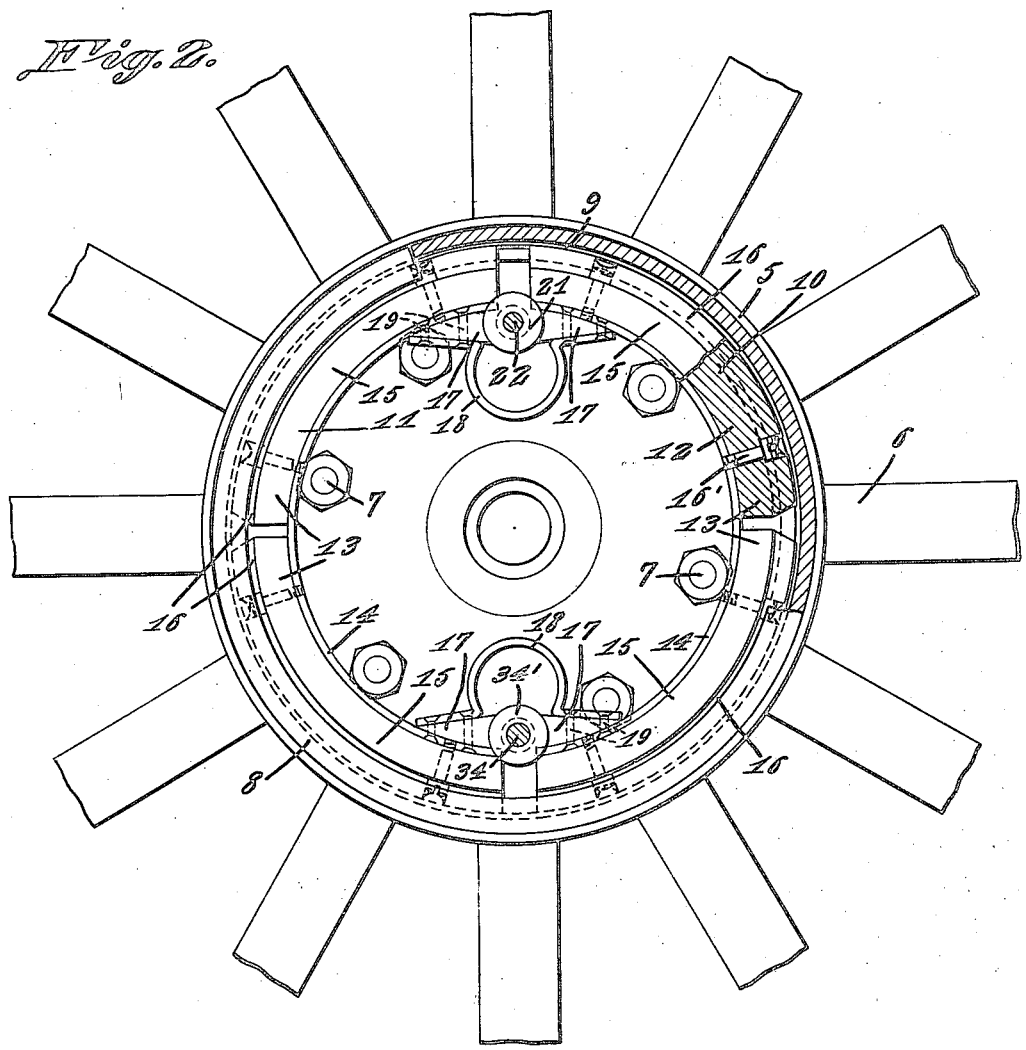
Figure 2 is an elevational view of the brake housing, a portion thereof being broken away to show the relation of the movable brake elements with the brake band.

Referring to the drawings in detail, the reference character 5 designates a portion of the brake housing which is bolted to the spokes of the wheel 6, as by means of the bolts 7. The brake housing supports a stationary brake band 8 which is secured to the inner surface thereof, the braking surface of the band 8 being formed into a groove 9 to accommodate the movable braking member 10. This braking member 10 comprises opposed sections 11 and 12, each section including a pair of curved supports 13 connected as by means of the curved bands 14 which are formed of flexible metal to expand and contract in a manner to be hereinafter more fully described.

Mounted on each of the supports 13 is a brake lining 15, the braking surface thereof being formed with inclined walls 16 to fit within the groove of the brake band 8, to set up a wedging action between the brake band and brake lining and accomplish the braking result. Set screws 16' extend through the linings and supports, the threaded extremities thereof being positioned in suitable threaded openings of the bands 14.

Blocks 17 are secured to the sections 11 and 12 of the braking member at points in proximity to the adjacent ends thereof, which blocks provide supports for the spring members 18 which are also bolted to the blocks by the bolts 19 that extend into the bands 14.

Positioned between the blocks 17 at the upper extremity of the brake housing, are the cone-shaped members 20 and 21 respectively, the cone-shaped member 20 being carried at the inner end of the rod 22, the outer end of which is squared as at 23 to fit in the squared opening of the arm 24, whereby movement of the arm 24 results in a relative movement of the rod 22. An adjusting nut 25, is mounted on the outer extremity of the rod 22, whereby the cone-shaped member 20 may be moved with respect to the sectional brake member to compensate for wear in the brake member.

The reference character 26 designates a tubular member formed with a threaded extremity 27 positioned in a threaded opening of the flange 28 formed on the axle housing 29. The rod 22 also supports the cone-shaped member 21, which has one surface thereof contacting with the inner surface of the flange 28. This rod 22 extends through the tubular member 26 as clearly shown by Figure 1 of the drawings.

A cam surface 30 is formed at the outer end of the tubular member 26 and cooperates with the inclined surface 31 of the extension 32 of the arm 24 so that when the arm 24 is rotated, the inclined surfaces will engage to cause the rod 22 to move within the tubular member 26 moving the cone-shaped members towards each other and causing a binding action between the sections of the movable braking member 10, to cause the braking sections to move away from each other, and bind within the brake band 8.

Disposed at the base of the flange 28 is an opening 33, which opening accommodates the threaded shaft 34 which has portions thereof threaded in opposite directions to accommodate the cone-shaped members 35 which are also threaded.

A portion of the shaft 34 extends beyond the flange 28 as at 36, whereby the cone-shaped members 34' and 35 may be adjusted with respect to each other to accomplish the adjustment of the sections of the brake member 10. In the form of the invention as illustrated by Figure 3 of the drawings, a rod 37 is provided, which rod supports the cone-shaped members 38 that are held in spaced relation as by means of the coiled spring 39, the outer surfaces of the cone-shaped members 38 being inclined as at 40, where the same contact with the inclined surfaces 41 and 42 respectively of the brake housings formed by members 33 and 34.

From the foregoing it will be seen that as the arm 34 is moved, the camming surfaces cooperate to move the cone-shaped members towards each other, it being understood that the cone-shaped members are positioned between the opposed sections of the braking member 10, in a manner as heretofore described.

Having thus described the invention, what is claimed as new is:—

1. In combination with a brake housing, a brake band secured to the brake housing, a sectional brake member positioned within the brake housing and adapted to be moved into engagement with the brake band, cone-shaped members disposed between the adjacent ends of the sections, means for manually controlling the cone members to move the sections away from each other, and means for normally urging the sections towards each other.

2. In combination with a brake housing, a brake band mounted within the housing, a sectional braking member within the housing and adapted to cooperate with the brake band, to accomplish a braking result, a stationary cone-shaped member disposed between the adjacent ends of the section of the braking member, a movable cone-shaped member cooperating with said stationary cone-shaped member, means for moving the movable cone-shaped member to wedge the sections of the braking member away from each other, and a spring secured to the adjacent ends of the sections for normally urging the sections towards each other.

In testimony that I claim the foregoing as my own, I have hereto affixed my signature in the presence of two witnesses.

SAMUEL B. LEITZELL.

Witnesses:
J. H. COCHRAN,
E. P. PEFFER.